US010504145B2

(12) United States Patent
Garg

(10) Patent No.: US 10,504,145 B2
(45) Date of Patent: Dec. 10, 2019

(54) AUTOMATED CLASSIFICATION OF NETWORK-ACCESSIBLE CONTENT BASED ON EVENTS

(71) Applicant: GumGum, Inc., Santa Monica, CA (US)

(72) Inventor: Roopal Garg, Los Angeles, CA (US)

(73) Assignee: GumGum, Inc., Santa Monica, CA (US)

( * ) Notice: Subject to any disclaimer, the term of this patent is extended or adjusted under 35 U.S.C. 154(b) by 385 days.

(21) Appl. No.: 15/602,706

(22) Filed: May 23, 2017

(65) Prior Publication Data

US 2018/0341980 A1 Nov. 29, 2018

(51) Int. Cl.
*G06Q 30/00* (2012.01)
*G06Q 30/02* (2012.01)
*G06F 16/951* (2019.01)

(52) U.S. Cl.
CPC ....... *G06Q 30/0255* (2013.01); *G06F 16/951* (2019.01); *G06Q 30/0252* (2013.01); *G06Q 30/0277* (2013.01)

(58) Field of Classification Search
CPC .................................................. G06Q 30/00–84
USPC ............................................ 705/14.1–14.73
See application file for complete search history.

(56) References Cited

U.S. PATENT DOCUMENTS

| 10,109,017 | B2* | 10/2018 | Bothwell | G06N 20/00 |
| 2011/0137904 | A1* | 6/2011 | Rajaram | G06Q 30/02 |
| | | | | 707/740 |
| 2013/0080434 | A1* | 3/2013 | Subasic | G06F 16/355 |
| | | | | 707/737 |

OTHER PUBLICATIONS

Broder, Andrei et al, "A Semantic Approach to Copntextual Advertisng", SIGIR 2007, Session 23, Web IR II, pp. 559-566 (Year: 2007).*
Broder, Andrei et al., 'A Semantic Approach to Contextual Advertising', SIGIR 2007 Proceedings, Session 23: Web IR II.
Cambridge University Press, 'Scoring, term weighting and the vector space model', Apr. 1, 2009.
Gali, Najlah et al., 'Similarity Measures for Title Matching', 2016 23rd International Conference on Pattern Recognition (ICPR, Cancún Center, Cancún, México, Dec. 4-8, 2016. pp. 1549-1554.
Havrlant, Lukáš et al., "A Simple Probabilistic Explanation of Term Frequency-Inverse Document Frequency (tf-idf) Heuristic (and Variations Motivated by This Explanation", *International Journal of General Systems*, vol. 00, No. 00, May 23, 2014.
Me et al., 'Contextual advertising', Wikipedia—the free encyclopedia, May 18, 2017, pp. 1-3, https://en.wikipedia.org/w/index.php?title=Contextual_advertising&oldid=781081222, retrieved on Jul. 30, 2018.

(Continued)

*Primary Examiner* — John Van Bramer
(74) *Attorney, Agent, or Firm* — Knobbe, Martens, Olson & Bear, LLP

(57) ABSTRACT

Systems and methods are provided for generating and using classification models to automatically classify pages or other source content as including text about one or more real-world events. Generating the classification models may include analyzing text content of a large number of different pages from both a reference source and from more dynamic sources, such as from publisher sources via a network. Features for training classifiers may be determined based in part on the top n-grams identified among pages that have been determined to be associated with a given event.

20 Claims, 6 Drawing Sheets

(56) References Cited

OTHER PUBLICATIONS

PCT Search Report and Written Opinion for Application No. PCT/US/2018/033745, dated Aug. 7, 2018.
Rawashdeh, Ahmad at al., 'Similarity Measure for Social Networks—A Brief Survey', EECS Department, ML 0030, University of Cincinnati, Apr. 2015.
Sayadi, Karim et al., 'Multilayer classification of web pages using Random Forest and semi-supervised Latent Dirichlet Allocation', 201515th International Conference on Innovations for Community Services (I4CS), IEEE, Jul. 2015.

\* cited by examiner

AUTOMATED CLASSIFICATION OF NETWORK-ACCESSIBLE CONTENT BASED ON EVENTS

BACKGROUND

A large amount of new content is published across the Internet every day. This content includes, for example, news articles, blog entries, and social media posts, among others. The content owners or other authorized parties often configure their websites or applications to present advertisements in association with published content, such as by presenting a banner advertisement or other advertisement on a webpage that also includes the article or other primary content. These advertisements may be selected dynamically at the time that the content is presented for display to a given user. Advertising services (which may include an advertising network that connects advertisers with publishers or other website operators) may employ an automated process, such as contextual advertising or contextual targeting techniques, to select an advertisement in a given instance that is relevant to the page on which the advertisement will appear. For example, a contextual advertising system may scan the text of a website for the presence of any keywords previously established by an operator of the advertising system, then may return an advertisement based on the identified keywords. In a sample instance, if a user views a website that includes words that a contextual advertising system has previously associated with basketball, the user may see advertisements for basketball-related companies.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
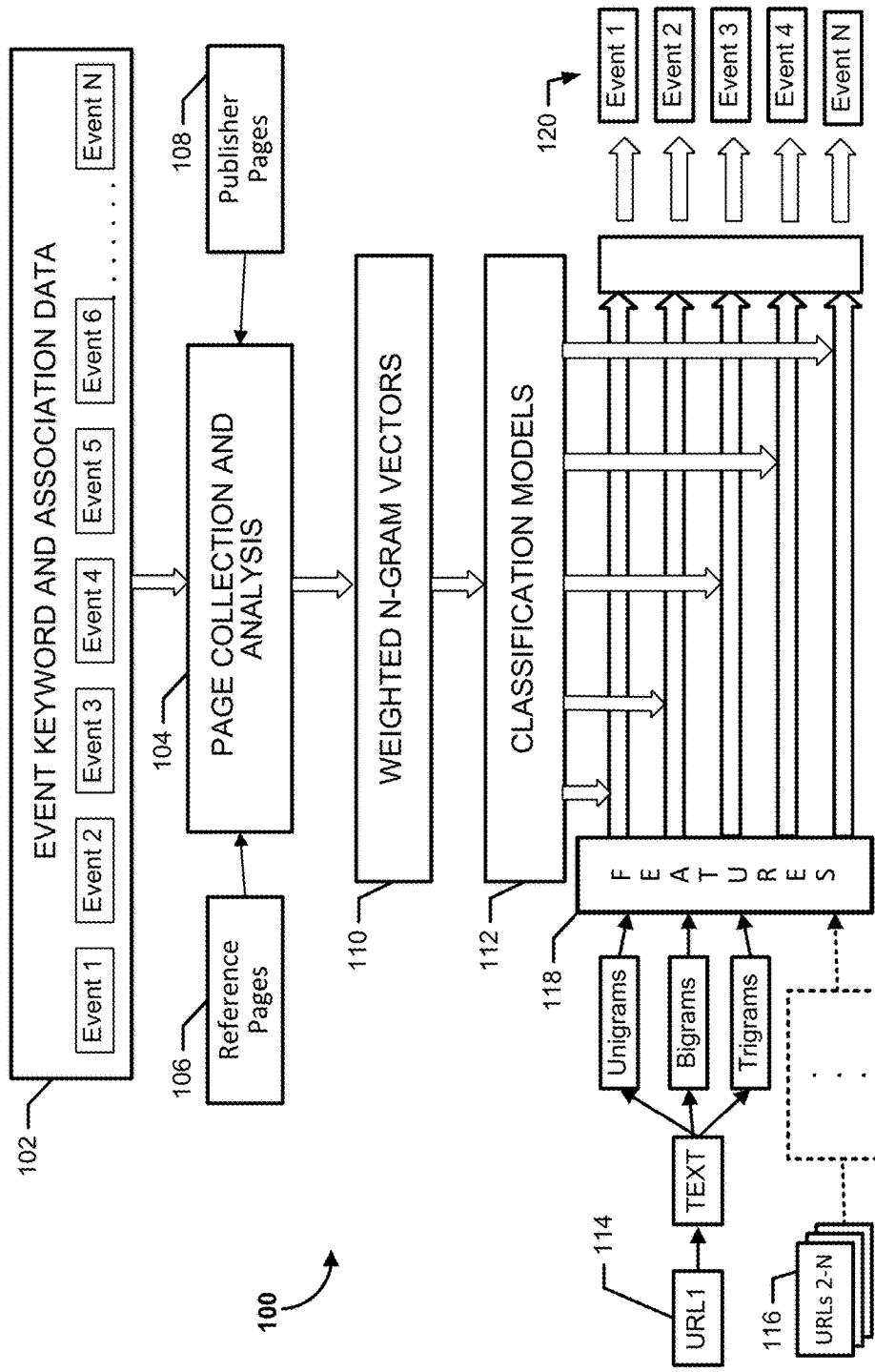
FIG. 1 is a flow diagram providing a high-level overview of an illustrative method for building and using classification models to classify pages as relating to different real-world events.

Generally described, aspects of the present disclosure relate to generating classification models for automatically classifying pages or other input text as relating to one or more events, such as a real-world sporting event, concert, award show, holiday, political event, etc. Classifying a webpage or other page as being about a specific event (such as identifying that a news article within a page is an article about a specific sporting event) can be very useful in the field of advertising, such as to dynamically present an advertisement that is related to the specific event in association with display of the page. For example, a better user experience can be expected when an advertisement for a tennis racket is presented to a user who is reading an article about the Australian Open tennis event than if the same tennis racket advertisement were to be presented to a user who is reading an article about a political election.

One approach to configuring a system to automatically identify whether text of a page is discussing a specific event is to search the page text for a list of keywords known to be associated with that event. For example, an existing contextual advertising system could be modified to identify events if a system administrator or other individual manually created a list of keywords for different events and provided those keywords to the system. However, such an approach relies on a significant amount of manual work by a human, such that maintaining and updating such a system is tedious and time consuming. Furthermore, determining how well-suited the manually selected keywords are for a given event may take significant additional time and testing, and may require a prohibitively long amount of time if the system is intended to recognize pages associated with even a modest number of different events. Aspects of the present disclosure provide systems and methods for training classifiers to identify pages whose content is discussing specific events in an automated fashion. As will be discussed below, aspects of the present disclosure include collecting and building a map or ranked list of event-related n-grams from both reference pages and publisher pages, where the n-gram information reflects both general and trending information about each event. The n-gram data may then be used to train and build a binary classifier (such as a Random Forest classifier) or other classifier for each event. These classifiers or classification models can then be used in real time to determine whether a given page or other input content appears to be discussing any of the events that the model has been trained to identify.

As used herein, an "n-gram" or "ngram" generally refers to a string or set of one or more words in a fixed order. As is known in the art, a one word n-gram (i.e., n=1) may be referred to as a unigram, a two word n-gram (i.e., n=2) may be referred to as a bigram, and a three word n-gram (i.e., n=3) may be referred to as a trigram. A given sentence may include a number of unigrams, bigrams, trigrams and other n-grams (such as those for which 'n' is greater than three) within it. Some of these n-grams identified in source text may overlap each other in the source text, such that they share one or more words with each other. For example, in the sentence "This is a sample," each word may be a unigram, each two word set that appears together may be a bigram (e.g., "This is," "is a," and "a sample"), and each three word set that appears together may be a trigram (e.g., "This is a," and "is a sample").

Depending on the events of interest in a given implementation or environment, the technical problem of classifying a page as relating to one or more events (one of the problems addressed by aspects of the present disclosure) may differ from the more general problem of classifying a page as related to a general topic. For example, a specific sporting event (such as the 2017 Australian Open) may be associated with trending information that is frequently changing as the event approaches or progresses, as well as more general information that is common across different past instances of similar events (such as the 2016 Australian Open, previous Australian Opens, and/or tennis tournaments generally). Similarly, a specific musical act's concerts may each have some common aspects (such as aspects related to the band itself, the record label, opening acts, etc.), as well as information that differs from night to night of a given tour (such as the city and venue for that specific concert). Furthermore, unlike a general topic (such as tennis), information related to certain events is only first available for a relatively short time period prior to the event time and may change frequently. For example, information such as the specific candidates nominated for awards at a given awards show event or the participants participating in (or who have not yet been eliminated from) a given sporting event may only be known just prior to or during the given event. Therefore, repeated research would need to be performed if a human were to attempt to maintain accurate keyword lists for such events. Accordingly, a system that relies on human input to assign keywords to each event is likely to be impractical and/or imprecise, particularly with respect to attempts to maintain keyword information for each of a large number of different events across a variety of subject matter areas.

Given the nature of the training data suggested for use according to certain embodiments of the present disclosure, the term "event" as used herein is generally intended to refer to an occasion or occurrence that is publicly known of before and/or after it occurs. Information may be known about some events prior to the event occurring (such as information regarding a sporting event that is scheduled to occur shortly), while information regarding other events may not be known until during or after the event (such as information regarding a specific earthquake). However, it will be appreciated that aspects of the present disclosure may alternatively be used to identify private events for which there is no publicly available information, provided that sufficient information can be provided for training the classification models described herein (such as by using a private reference page that discusses a private event in the training process). For example, in one embodiment, a private event could be an event that is not generally know of outside of a specific group or organization (such as a private party or a company meeting), and the pages used in training may include pages from a company intranet, emails, and/or other information that is not available to the public. In some such embodiments, aspects of the present disclosure may be used for purposes other than advertising, such as to suggest distribution lists for a given email or other file, to automatically tag documents as relevant to the given event, etc.

Non-limiting examples of events include a sporting event, concert, holiday, political event, natural event (such as a specific natural disaster, eclipse, and the like), legal events (such as a newsworthy criminal trial), a conference, a speaking event, and/or many others, depending on the embodiment. While reference is made herein to "real-world events," events identified according to aspects of the present disclosure need not occur at any specific geographic location (for example, a holiday event like New Year's Eve is not location specific). Furthermore, aspects of the present disclosure may be used to identify events that occur over a communications or media network, as opposed to referring only to events at which people physically attend. For example, an event may include the airing of a season premiere of a television show, or an online video game tournament in which participants are physically remote from each other. Depending on the nature of a specific event, the event itself may last only a few minutes or may last multiple days or weeks.

FIG. 1 is a flow diagram providing a high-level overview of an illustrative method 100 for building and using classification models to classify pages as relating to different real-world events. The illustrative method 100 may be performed by computing system 502, which will be described below with reference to FIG. 5. The illustrative method 100 begins with page collection and analysis block 104, during which the computing system collects pages (such as reference pages 106 and publisher pages 108) for analysis with respect to event keyword and association data 102. The event keyword and association data 102 may include, for example, a list of event names and an optional set of keywords associated with each event. In some embodiments, the keywords may be helpful to distinguish an event from other events having similar names, such as by considering content to be related to a specific event when a combination of the event's name and a keyword associated with the event are present in the content. As one example, a tennis event named "2017 U.S. Open" may be associated with the keyword "tennis," whereas a golf event named "2017 U.S. Open" may be associated with the keyword "golf." The keywords associated with an event in the event keyword and association data may not be intended to be a complete set of keywords related to the event.

In one embodiment, the references pages 106 may be pages from an encyclopedia or similar reference source. For example, each of the reference pages 106 may be a network-accessible page that includes information regarding a specific term, concept, person, place, or other topic. In some embodiments, the reference pages 106 may have been professionally authored or edited, while in other embodiments, the pages may have been created and modified as part of a collaborative effort by many different individuals (such as what is sometimes referred to as a "wiki"). In some embodiments, each reference page may include a clear indication of the topic of the page, such as in the page title, metadata, header, and/or a uniform resource identifier ("URI"). Depending on the source of the reference pages 106, the reference page may be retrieved by submitted an automated search to a server or via an application programming interface ("API"). For example, in one embodiment, the computing system as disclosed herein may send a request via an API offered by a reference source provider for a page associated with a specific event for which the computing system 502 is attempting to identify by providing the name of the event (e.g., "2017 Australian Open") in a request via the API. The computing system 502 may be configured to retrieve reference pages associated with specific events in other manners depending on the individual reference source used in a given embodiment. For example, a given reference source may use a certain URI structure, such that the computing system 502 is configured to request a page associated with a given event or topic by placing the event or topic name in the appropriate position of a URI template (e.g., a sample reference source may have its reference page for any given topic available from a URI that follows the format of "https://www.wiki.xyz/topic", where the "topic" portion may be a placeholder that is replaced by the name of whatever topic is of interest).

The publisher pages 108 may be from less structured or less topic-focused sources than the reference pages 106. In one embodiment, the reference pages 106 may be formatted such that it is relatively clear that any given reference page contains content about a specific topic, while the publisher pages 108 may include pages from a variety of sources that are formatted in a variety of ways. For example, the publisher pages may include news articles, blog posts, microblogs, social media posts, press releases, and/or other pages from a potentially wide range of websites or other sources. Accordingly, in some embodiments, each of the reference pages 106 may generally be considered to provide relatively static and general information about an event (or other topic) that is relatively easy to identify from the page, while each of the publisher pages 108 may have the potential to provide more trending information regarding an event or to be authored in a style or format that differs from that of the reference pages 108. For example, a reference page 106 may be authored in a relatively formal manner and present general factual information, whereas a publisher page may include editorial information (such as in a blog post or news article), slang or other informal language (such as in a social media post or blog post), and/or very current information regarding some aspect of an event (such as a short announcement that an additional band has just been added to a concert). In some embodiments, the analyzed publisher pages may be limited to those publisher pages authored or edited within some predetermined time threshold, such as in the last 30 days, where the time threshold may depend on the nature of the event being analyzed (such as whether the information associated with the event is likely to change frequently).

While "pages" are often used as the example content type analyzed herein, it will be appreciated that the underlying content may be other text-based content that may not be considered a page, such as a multi-page document, a user interface, any content having a textual portion that is available via a URI over a network, etc. Similarly, text content that may be retrieved via an API or otherwise through methods other than requesting a specific URI, whether or not returned in the form of a page, may be used in some embodiments.

The publisher pages 108 may be considered "publisher" pages in some embodiments because these pages may be hosted by, provided by, authored by or otherwise associated with various publishers that use an advertising network or advertising service, where the advertising service employs the event identification systems and methods described herein to select event-related advertisements for a given publisher page. For example, as is known in the art, an advertising service may enable a number of publishers (such as news websites, social media service providers, blog authors, etc.) to include code in their pages that cause an advertisement request to be sent to an advertisement service whenever the page is loaded on a client device, where the request may include various information regarding the page that the advertisement service may use to dynamically select an advertisement to display on the page in the given instance.

If an advertisement service is employing event identification aspects of the present disclosure to determine whether an advertisement associated with a given event should be shown on a given publisher page, it may be advantageous to train the event classification models described herein using publisher pages as one of the training data sources. This may provide event identification accuracy improvements over using only reference pages, for example, because reference pages may be written in a different style or include less trending information than the publisher pages that the classification models will be used to analyze post-training. While the term "publisher pages" is used herein to describe the collected pages other than the reference pages, it will be appreciated that in other embodiments, the pages used for training may include pages or content of other types, particularly where the trained classification models are configured for use outside of the context of analyzing publisher pages for advertising purposes.

Returning to the page collection and analysis block 104, the computing system 502 may analyze the collected pages to identify a set of publisher pages and a set of reference pages for each of a number of individual events identified in the event keyword and association data 102. These determinations will be described in greater detail below with respect to FIGS. 3A and 3B. As one example according to one embodiment, the reference page set for an event may include a page in an encyclopedia-like source regarding the given event, as well as one or more other reference pages referenced within that page (such as encyclopedia-like entries for other topics associated with the event). In the same example embodiment, the publisher page set for the same event may include, for example, publisher pages that each include the event name within the URI for the page. The URI may be used, for example, because it may be advantageous to select publisher pages for which the system has a high confidence level that the page is about the given event (which is generally likely if the URI for a page includes the event name itself within the URI). The system may additionally look within the publisher pages' content and/or URI for one or more of the keywords associated with the event in the event keyword and association data 102.

As will be described in more detail below with reference to FIG. 2, the result of the computing system's analysis of the reference pages 106 and publisher pages 108 at block 104 may be a set of weighted n-gram vectors for the various events, as represented by block 110 in FIG. 1. For example, the computing system may create one or more dictionaries that includes various n-grams appearing in the collected pages, and may then create a vector for each event that includes weights for the various n-grams. The weights may be based on master terms scores that are determined for the pairing of an event and an n-gram, as will be discussed below, and may be separately determined with respect to the reference pages and with respect to the publisher pages. For example, a reference master vector and a publisher master vector may each be generated for each event. In some embodiments, the weighted n-gram vectors may generally provide sufficient information to determine the n-grams that are most strongly correlated with each of the events based on the computing system's analysis of the collected page content according to methods described further below.

The weighted n-gram vectors may then be used to generate classification models at block 112. As will be described further below, the top publisher n-grams and reference n-grams for each event (such as the top 500 unigrams, top 500 bigrams, and top 500 trigrams, in one embodiment) may be selected as features when training a classifier for the given event. In one embodiment, a random forest classifier or classification method may be used by the computing system to build the classification models. Other classification methods could be used in other embodiments, such as Support Vector Machines or statistical regression models.

Once the classification models have been generated, pages available from various URIs or URLs may be analyzed using the classification models to identify which events, if any, relate to each page. For example, the page available from URL 114 may be retrieved from a server and n-grams may be extracted from the text of the page (such as various unigrams, bigrams and trigrams appearing in the page). A subset of these n-grams may then be provided as features to the event classification models using similar techniques as described above. The classification models may then determine, for example, that specific pages available from URLs 114 and/or 116 include textual content that appears to be about a specific one of the events 120 based on the output of the classifier corresponding to that event. In some instances, a page may include text content regarding more than one event, in which case the classification models may assign a non-zero probability or confidence level (such as a value between zero and one) to the same page for each of multiple events. The event determination for a given page may then be used for a variety of purposes, such as to select an advertisement related to the given event for display in association with the given page (not illustrated in FIG. 1).

Figure 2:
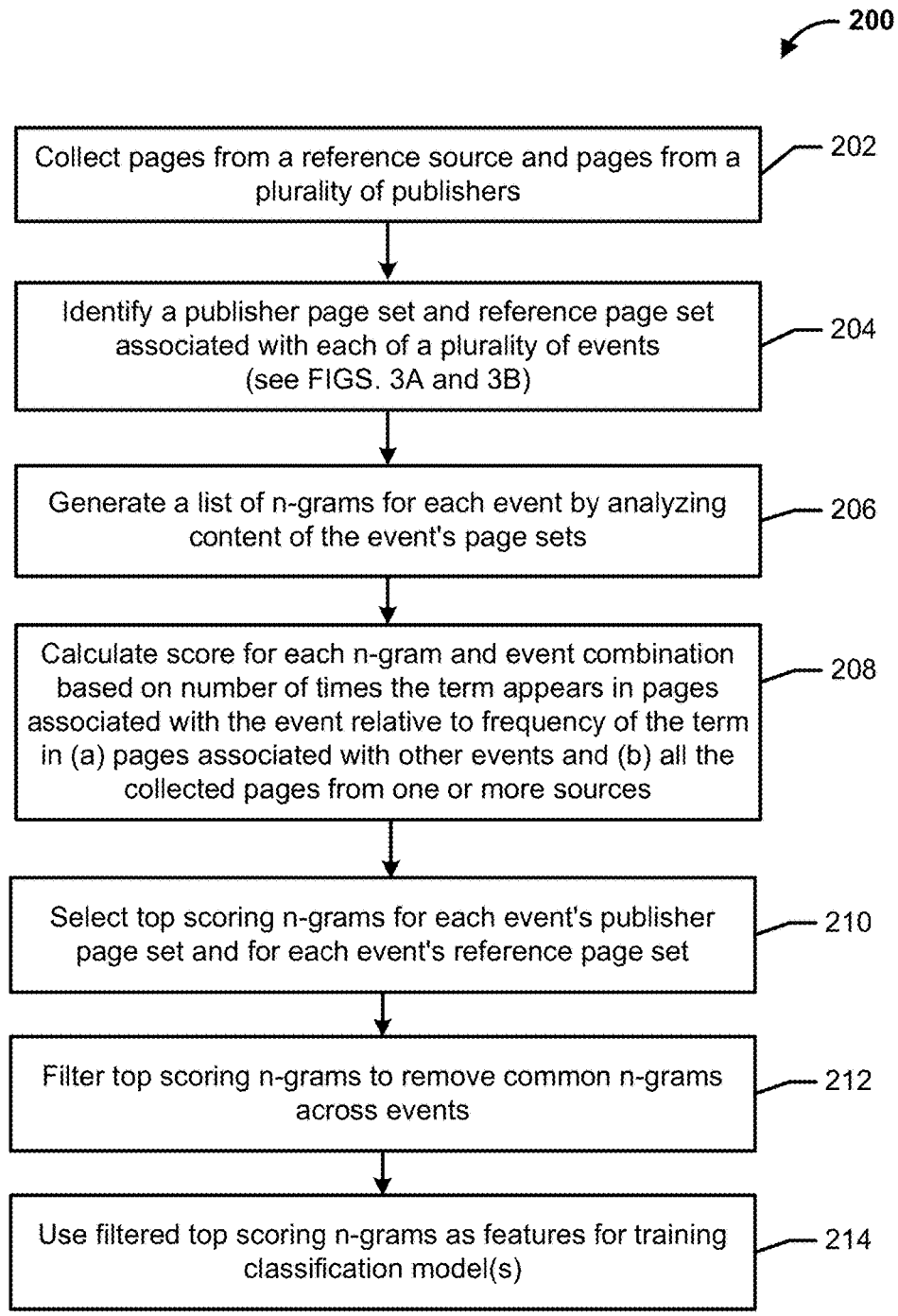
FIG. 2 is a flow diagram of an illustrative method for collecting page data and selecting features for training an event classification model.

FIG. 2 is a flow diagram of an illustrative method 200 for collecting page data and selecting features for training an event classification model. The illustrative method 200 may be performed, for example, by a computing system such as computing system 502, which will be described below with respect to FIG. 5. The illustrative method 200 begins at block 202, where the system collect pages from a reference source and pages from a plurality of publishers, as discussed above with respect to FIG. 1. As discussed above, the reference pages may generally be pages that are each about a different specific term, concept, person, place, or other topic, where the topic of each page is relatively clear to ascertain in an automated manner (such as from a title, metadata, header, and/or a URI of the page). As further discussed above, the publisher pages may be from less structured or less topic-focused sources than the reference pages.

At block 204, the computing system may identify a publisher page set and reference page set associated with each of a number of different events. Illustrative methods that may be performed at block 204 to determine the reference page set and publisher page set for each event will be discussed below with respect to FIGS. 3A and 3B, respectively. As discussed above, the events for which the page sets are determined may be previously established, such as by retrieving event names and optional related keywords from a data store. For example, in some embodiments, an operator of the computing system may maintain a list of upcoming events that are of potential interest to advertisers. In other embodiments, the computing system may be configured to learn of new events by analyzing content from a reference source or other source, such as by identifying new event reference pages that are available from a given reference source. For example, a reference source may tag pages that are about trending or popular events, and these tags may be searched by the computing system to identify an event name of such an event. As will be discussed further below, according to one embodiment, the reference page set for an event may include a page in an encyclopedia-like source regarding the given event, as well as one or more other pages referenced within that page. In the same example embodiment, the publisher page set for the same event may include publisher pages that each include the event name within the URI for the page.

Next, at block 206, the computing system may generate a list of n-grams for each event by analyzing content of each event's publisher page set and reference page set. For example, the computing system may extract the various unigrams, bigrams and trigrams appearing on each page. During the n-gram extraction process, the system may create a dictionary of n-grams found, and may maintain a count for each n-gram for each page set that indicates the number of times that the particular n-gram appears in that page set. For example, the computing system may determine that the bigram "knockout stage" appears ten times in the reference page set for the event "2018 World Cup," and appears zero times in the reference page set for the event "Thanksgiving."

At block 208, the computing system may calculate a score for each n-gram and event combination that may generally indicate how strongly correlated the given n-gram is with the given event. In some embodiments, one score may be determined for each n-gram with respect to a given event's reference page set, and another score may be determined for the same n-gram with respect to the same event's publisher page set. In other embodiments, the n-gram frequency data may be combined between the event's two page sets, such that only one score is determined for each combination of event and n-gram. The score for each n-gram for a given event's page set may be determined, in some embodiments, based on the number of times the term appears in the given event's page set (publisher page set and/or reference page set, depending on which score is being determined) relative to the frequency with which the term appears in: (1) pages associated with other events and (2) the universe of collected pages from one or more sources as a whole. In some embodiments, the system may apply a modified version of the known "term frequency-inverse document frequency" ("TF-IDF") scoring methodology, but that is adapted for use in event identification as discussed below.

While the TF-IDF method is typically calculated in existing systems on a per-page or per-document basis (e.g., a score is calculated with respect to a specific document), the computing system may instead apply a unique term frequency-inverse event frequency ("TF-IEF") method that includes calculating a score per n-gram per event, taking into account multiple pages within an event's page set. In one embodiment, the score for a given n-gram with respect to a given event's page set may be calculated using the equation below.

Final Score=Term Frequency*Inverted Event Frequency*Master Term Score

The term frequency may be the number of times that the given n-gram appears in the given event's page set. The Inverted Event Frequency ("IEF") may be calculated as log(N/ef), where N is the total number of events, and ef is the number of events in which the given n-gram is present in the event's page set. The IEF sub-score may generally indicate how uncommon an n-gram is among the universe of events, where the lesser the number of events that the n-gram occurs in, the higher the IEF sub-score is. The Master Term Score, which may be optional in some embodiments, may be calculated using the known TF-IDF method as the TF-IDF score for the n-gram across all pages from a given source, such as all reference pages available in a particular language from a given reference source (including, for example, pages that are not directly related to any event considered by the computing system). In other embodiments, the Master Term Score may be generated in other manners. For example, the Master Term Score may be a number retrieved from a data store that generally indicates the inverse frequency with which a given term is used in a given language. As additional examples, the Master Term Score may represent an inverse frequency with which the given n-gram or term appears in news articles over a given time period (such as the past six months), appears in books, appears in webpages associated with one or more domains, or appears in some other content library.

Once the final scores are determined for the various n-gram and event set pairings, the illustrative method 200 proceeds to block 210, where the computing system selects the top scoring n-grams for each event's publisher page set and for each event's reference page set (or for a given event's combined event and publisher page set, depending on the embodiment). For example, in one embodiment, the computing system may select the top 500 unigrams, top 500 bigrams, and top 500 trigrams from each source (publisher page set and reference page set) for each event. In other embodiments, a different set number of top n-grams may be selected, or n-grams with scores above a threshold may be selected. At block 212, the computing system may then optionally filter the top scoring n-grams to remove common n-grams across events. For example, to avoid confusion in the resulting classification models, an n-gram that appears in the top scoring n-grams for multiple events (or above a threshold number of events) may be removed from the top n-grams lists.

At block 214, the computing system may then use the filtered top scoring n-grams for each event page set as features for training classification model(s). For example, in one embodiment, the top reference set n-grams for a given event and the top publisher set n-grams for the given event may be collectively used as the feature list for building and training a classifier for the given event, such as a Random Forest classifier. In this manner, a classifier may be generated for each event based on the feature list determined for each event. In the training process, in one embodiment, the computing system may use 90% of the collected page data as training data, with the remaining 10% used as test data.

In order to have negative examples for each event for training purposes, the computing system may use positive examples from one event as negatives examples for an unrelated event. In some embodiments, events may have been previously grouped into sibling events or placed in a hierarchy, such that the system can use the groupings or hierarchy to identify similar events. The computing system may skip feeding the positives of any given event as negatives to its sibling or related events. In some embodiments, the computing system may identify sibling or similar events in an automated fashion. For example, a clustering algorithm may be applied over a collection of pages for each event to identify sibling events. Alternatively, a Jaccard index, cosine distance, or other distance measure may be used to determine the similarity between pages of different events to identify sibling events.

Once the classification models are trained, they may generally be used to classify any textual content to determine if the content appears to be related to any of the events for which the classifiers were developed. Given the nature of the training data as publisher pages and reference pages, the classification models may perform best with respect to classifying either a reference page or a publisher page, since these types of content may be written in a different style than other types of content (such as a novel). For example, in a test implementation across 106 events, models trained using methods described herein achieved an average recall above 0.9. As will be appreciated, classification models could be developed using the methods described herein, but using different types of training content, if the models will be used to classify content of other types. The models may be retrained regularly (such as weekly or monthly), in some embodiments, such as using recently published pages as training data.

Figure 3A:
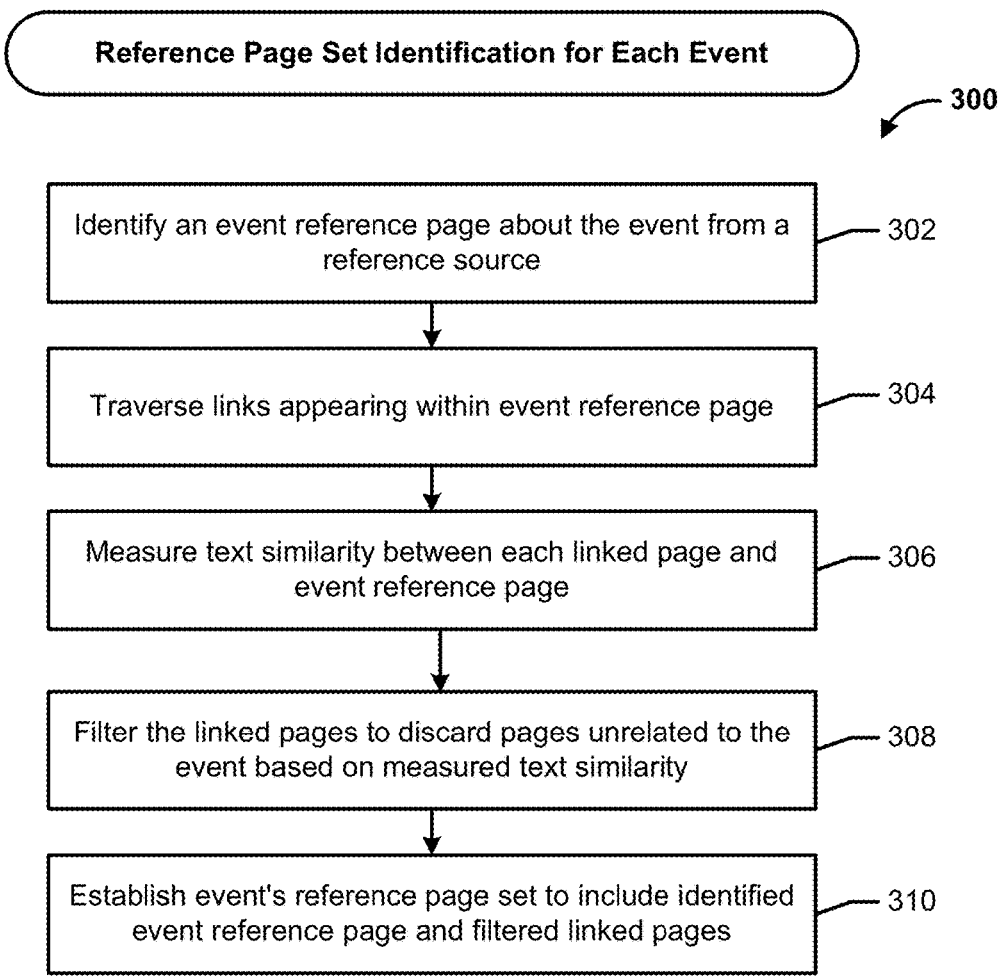
FIG. 3A is a flow diagram of an illustrative method for determining a reference page set for a given event.

FIG. 3A is a flow diagram of an illustrative method 300 for determining a reference page set for a given event. The method may be performed, for example, by computing system 502, which will be described below. The illustrative method 300 may occur as part of block 204 described above with respect to FIG. 2. The method begins at block 302, where the computing system identifies an event reference page about the event from a reference source. As discussed above, the reference page may be identified in a variety of ways depending on the specific reference source. For example, some reference sources may provide an API or search functionality that allows the computing system to send the event name (or other topic) to a server of the reference source and receive back the corresponding reference page for that event. In other embodiments, as discussed in more detail above, the computing system may be configured to determine the event name from the URI of a reference page, from the page's metadata or from content of the page itself (e.g., from the title, a heading, etc.).

Next, at block 304, the computing system may traverse links appearing within event reference page. For example, a reference page in an HTML format may include URI links within the page code that point to other reference pages. For example, a reference page about a certain music festival may include within the page links to pages regarding each of the various bands scheduled to appear at the festival, a link to a page about the concert venue, a link to a page about the city of the concert venue, a link to a page about the general topic of music festivals, etc. In order to resolve a potential issue of circular links (e.g., one of the linked pages including a link back to the main event reference page), the computing system may be configured to only traverse one way (e.g., only perform parent to child link traversals).

Another potential issue is the unrelated context problem. For example, a reference page for the Australian Open tennis tournament may include a link to a reference page about the country of Australia. The content within the reference page for Australia (including, for example, narrative text regarding the country's history, politics, economy, etc.) may be largely or completely unrelated to the Australian Open tennis event. To address this issue, at block 306, the computing system may measure the text similarity between each linked child page and the main event reference page. This similarity may be measured using a Jaccard index for the sets of n-grams appearing in the two pages, in one embodiment. In other embodiments, other distance measures may be used, such as cosine distance. At block 308, the computing system may then filter the linked pages to discard pages unrelated to the event, such as by discarding child pages that fall below a threshold similarity score with respect to the event's main reference page. At block 310, the event's reference page set may then be established to include the event's main event reference page and the filtered child pages (e.g., those pages linked within the event's reference page that have at least a minimum level of text similarity with the event's reference page).

Figure 3B:
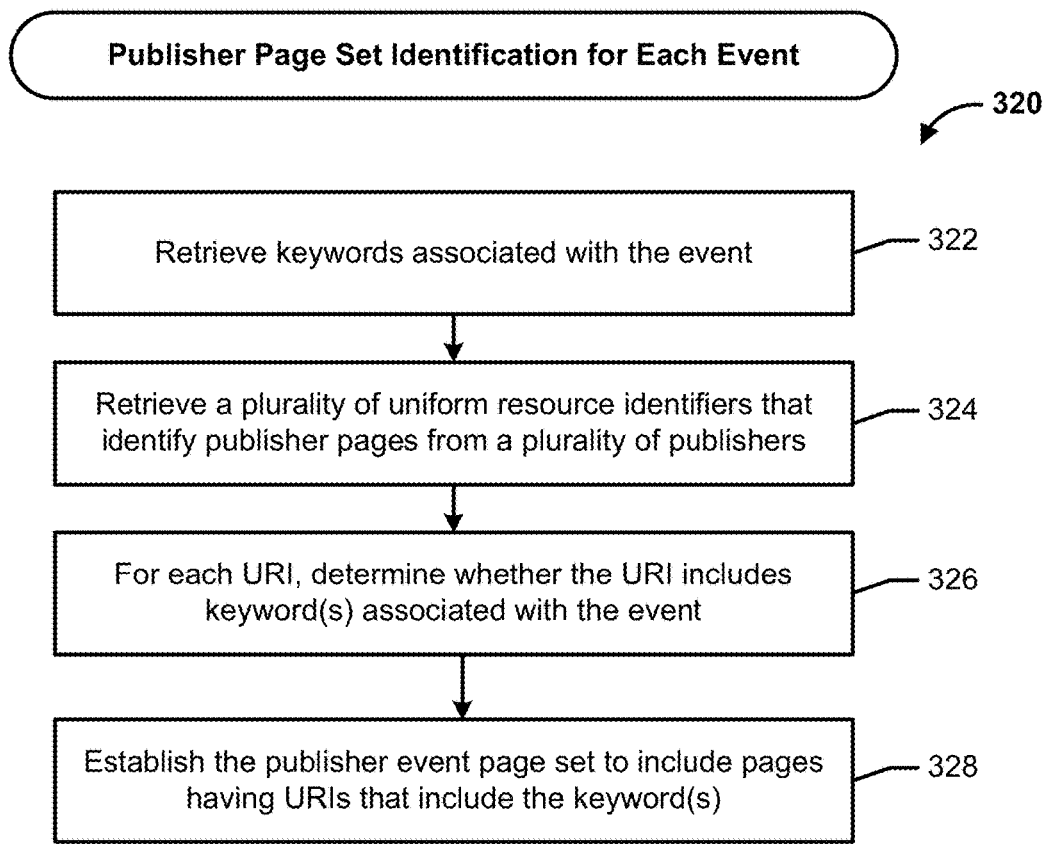
FIG. 3B is a flow diagram of an illustrative method for determining a publisher page set for a given event.

FIG. 3B is a flow diagram of an illustrative method 320 for determining a publisher page set for a given event. The illustrative method may be performed, for example, by computing system 502, which will be described below. Like method 300, the illustrative method 320 may occur as part of block 204 described above with respect to FIG. 2. The method 320 begins at block 322, where the computing system may retrieve one or more keywords associated with the event. As discussed above, in some embodiments, keywords may be stored in addition to event names to enable the computing system to distinguish between events with similar names or names that commonly refer to things other than the given event. As one example discussed above, a tennis event named "2017 U.S. Open" may be associated with the keyword "tennis," whereas a golf event named "2017 U.S. Open" may be associated with the keyword "golf."

Next, at block 324, the computing system may retrieve uniform resource identifiers that identify publisher pages. In some embodiments, this may include thousands of pages, including pages from many different publishers. As mentioned above, the URIs may be for publisher pages that utilize a given advertising service. For example, the advertising service may have stored lists of URIs that identify the pages that have requested an advertisement from the advertising service when displayed in a client device over some set time period (such as the last three months). In other embodiments, the URIs may additionally or alternatively be identified by the computing system crawling a variety of websites or other sources, such as social networks, news sources, blogs, etc. In some embodiments, the publisher pages may generally be selected in a manner such that they are from similar sources as, and/or written in a similar style to, the types of pages or content that the trained classifiers are expected to be used to classify.

At block 326, for each publisher page URI from block 324, the computing system may determine whether the URI includes the name and other keyword(s) associated with the event. As discussed above, in some embodiments, the event name and keywords may be intended to provide a high confidence that a given URI identifies a specific event when the keywords are present in the URI, rather than to identify all pages that relate to the given event. For example, the ultimate classifier that will be created based on hundreds of weighted n-grams will typically identify many pages related to the event that would not be identified as related to the event based on the small number of keywords considered at block 326. As an example, the keywords for the U.S. Open tennis event may be "us-open" and "tennis." In searching the URIs for the event's keywords, the system may search for minor variations or may do some text conversion depending on the formatting of each URI (such as how spaces are conveyed in the given URI, whether as an underscore, dash, plus sign, "%20" or other manner). In some embodiments, there may be Boolean operators or rule sets associated with the keywords, such that the computing system looks for any of various combinations of keywords that are linked by logical operators (e.g., determining that a URI is a match if it meets the criteria "(keyword1 AND keyword2) OR (keyword 3 AND keyword4)"). The publisher pages that include the event's keywords may then be established by the computing system as the publisher page set for the given event, at block 328. In other embodiments, the computing system may consider whether keywords appear in the page itself rather than only in the URI. For example, in such other embodiments, the computing system may include a page in the publisher event page set if the URI for the page includes the event name (e.g., "australian-open" appearing in the URI "https://www.xyz.xyz/news/australian-open-schedule-released.html") and the text body of the page includes the other event keywords (e.g., "tennis").

Figure 4:
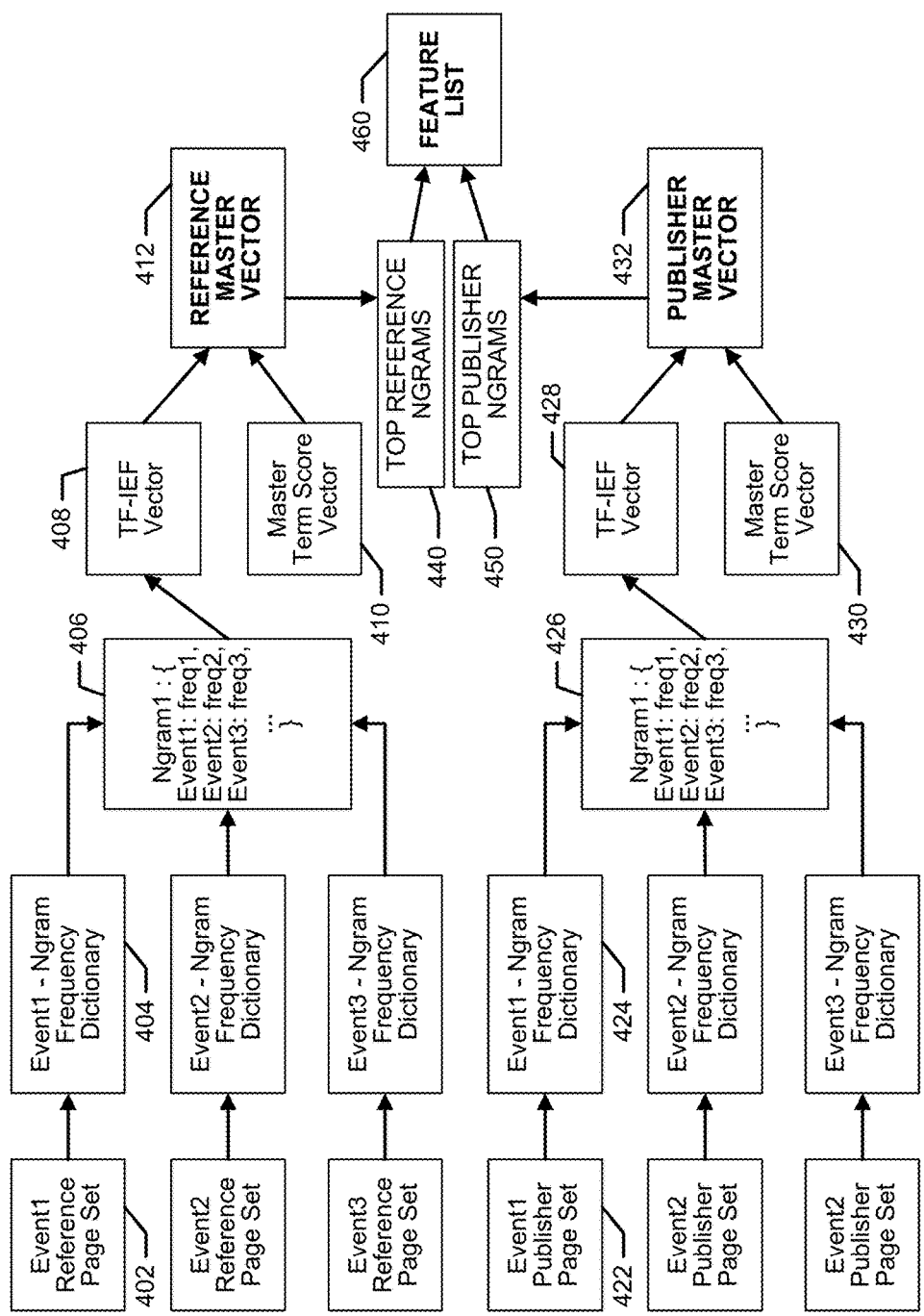
FIG. 4 is a flow diagram of illustrative data that may be generated at various steps of developing a feature list for event classification model generation.

FIG. 4 is a flow diagram of illustrative data that may be generated at various steps of developing a feature list for event classification model generation, as described herein. As illustrated, FIG. 4 begins with reference page sets and publisher page sets for individual events as initial input (shown as three events for simplicity of illustration, though many more would likely be included in practice). As discussed above, the computing system may have generated these page sets, such as the reference page set 402 for Event1 and the publisher page set 422 for Event1, from analysis of a larger set of pages. An event-ngram frequency dictionary may be created for each event. For example, dictionary 404 may include each n-gram that appears in one or more pages of the Event1 reference page set 402, while dictionary 424 may include each n-gram that appears in one or more pages of the Event1 publisher page set 422. In some embodiments, dictionaries for the same event (e.g., dictionary 404 and dictionary 424 for Event1) may be identical and be generated to include each n-gram that appears in one or both of the event's reference page set or publisher page set.

While only partial data for one n-gram ("Ngram1") is illustrated, the data structure 406 represents, for each n-gram appearing in any of the events' reference page sets, a list of the frequencies with which that n-gram appears in each event's reference page set. Similarly, the data structure 426 represents, for each n-gram appearing in any of the events' publisher page sets, a list of the frequencies with which that n-gram appears in each event's publisher page set. Proceeding through from left to right in FIG. 4, the example data shown to the right of blocks 406 and 426 is shown with reference to one event (e.g., "Event1," which may represent the 2017 Australian Open, based on examples above), but may be repeated for the other events (not illustrated in FIG. 4).

At block 408, a TF-IEF vector (term frequency-inverse event frequency vector) for the specific event is generated based on the data in block 406. Determining the scores for the TF-IEF vector for each n-gram is discussed above. Each dimension of the TF-IEF vector may correspond to the TF-IEF score of a different n-gram from the dictionary 404, for example. This TF-IEF vector 408 for the event and a master term score vector 410 (having values that are not event-specific, as discussed above) are then used to generate the reference master vector 412 for the event. Similarly, TF-IEF vector 428 for the same event's publisher page set and the master term score vector 430 are used to generate the publisher master vector 432. A predefined number of top n-grams (or number of top unigrams, number of top bigrams, and number of top trigrams, or n-grams meeting a minimum threshold value) may then be determined from the two master vectors to generate top reference n-grams 440 and top publisher n-grams 450. The result of FIG. 4 may then be a feature list 460 for the given event based on the top reference n-grams 440 and top publisher n-grams 450 for the given event. As discussed above, additional steps may occur that are not shown in FIG. 4, such as filtering the top n-grams to remove common n-grams across events.

Figure 5:
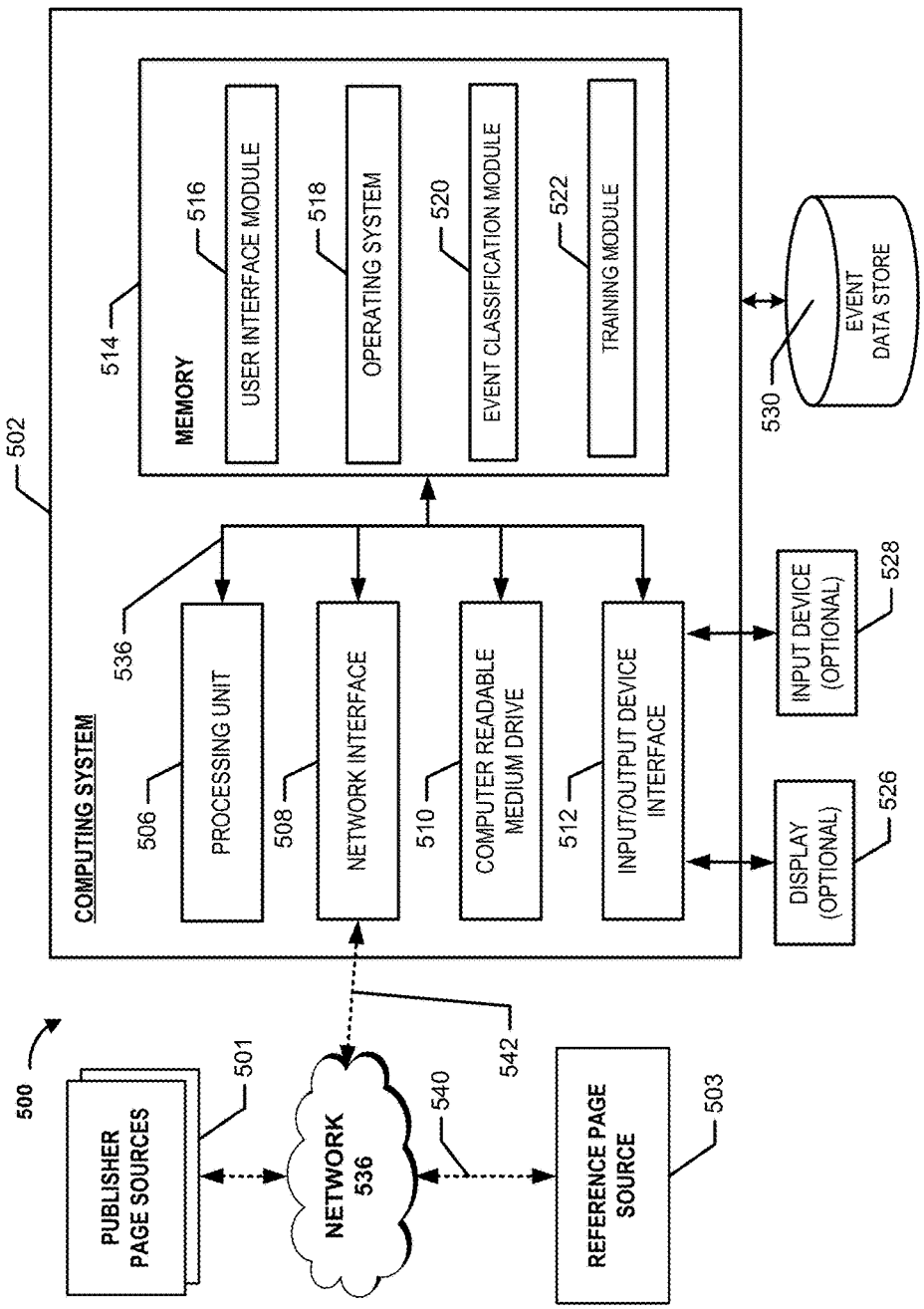
FIG. 5 is a system block diagram of a computing environment suitable for use in various embodiments of the present disclosure.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5. It is not necessary, however, that all of these generally conventional elements be shown in order to provide an enabling disclosure. Those skilled in the art will recognize that the computing system 502 may be any of a number of computing systems including, but not limited to, a laptop, a personal computer, one or more servers, and the like.

As illustrated, the computing system 502 includes a processing unit 506, a network interface 508, a computer readable medium drive 510, an input/output device interface 512, an optional display 526, and an optional input device 528, all of which may communicate with one another by way of a communication bus 536. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on the computing system 502 or a client computing device that is in communication with the computing system 502.

In some embodiments, the memory 514 may include an event classification module 520 and training module 522, which may be executed by the processing unit 506 to perform operations according to various embodiments described herein. The modules 520 and/or 522 may access the data store 530 in order to retrieve data described above and/or store data. The data store may be part of the computing system 502, remote from the computing system 502, and/or may be a network-based service. For example, the event data store 530 may store, at various points in classification model generation, event names and keywords, URI lists, and/or the various intermediate data and final classification model information described above.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with one or more reference page sources 503 via the network 536, such as the Internet. In particular, the computing system 502 may establish a communication link 542 with a network 536 (e.g., using known protocols) in order to send communications to the computing system 503 over the network 536. Similarly, the computing system 503 may send communications to the computing system 502 over the network 536 via a wired or wireless communication link 540. The computing system 502 may additionally communicate via the network 536 with a number of publisher page sources, such as third-party servers hosting publisher pages, and/or client devices that send page information to the computing system 502 as a result of code within a publisher's page executing on the client devices. The reference page sources 503 may be, for example, a server from which reference content is available via webpages or an API.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, or a device controller, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   a computing device, comprising a physical processor, that is in communication with the memory and that is configured with processor-executable instructions to perform operations comprising:
   for each event of a plurality of events:
      retrieve a reference page associated with the event, wherein the reference page comprises narrative text regarding the event, wherein the reference page further comprises a plurality of references to other pages;
      access the other pages referenced in the reference page;
      generate a first set of terms associated with the event, wherein each of the terms in the first set comprises one or more words, wherein the first set includes (a) one or more terms appearing in text of the reference page and (b) one or terms appearing in text of at least one of the other pages referenced in the reference page;
      determine a plurality of network-accessible pages regarding the event based at least in part on determinations that each page of the plurality of network-accessible pages includes a name of the event within a uniform resource identifier for the page;
      generate a second set of terms associated with the event, wherein each of the terms of the second set comprises one or more words appearing together in at least one of the plurality of network-accessible pages regarding the event;
      for each term in the first set of terms and second set of terms associated with the event, generate a score for the term that represents a strength of association between the term and the event, wherein the score for each term is generated based at least in part on a number of times that the term appears in pages associated with the event relative to (a) a first frequency with which the term appears in pages associated with other events and (b) a second frequency with which the term is used in an entire collection of content;
      select a plurality of top scoring terms associated with the event, wherein the plurality of top scoring terms are selected from among the first set of terms and the second set of terms; and
   generate one or more classification models for determining whether an input page includes text content regarding one or more of the plurality of events, wherein at least a subset of the top scoring terms associated with each event are used as features in training the one or more classification models.

2. The system of claim 1, wherein the at least a subset of the top scoring terms associated with an event that are used as features are determined based at least in part by filtering the top scoring terms associated with the event to remove terms that are shared among at least a threshold number of different events.

3. The system of claim 1, wherein the operations further comprise:
   for each of the other pages referenced in the reference page for an individual event, determine a level of similarity between text of the other page and text of the reference page associated with the individual event;
   identify a subset of the other pages referenced in the reference page for the individual event as having content unrelated to the reference page based at least in part on the determined levels of similarity, wherein the subset of the other pages identified as unrelated to the reference page are ignored when generating the first set of terms associated with the individual event.

4. The system of claim 3, wherein determining the level of similarity comprises determining at least one of a Jaccard index or a cosine distance between the text of the other page and the text of the reference page.

5. The system of claim 1, wherein the plurality of network-accessible pages regarding an individual event are further determined based at least in part on determinations that each page of the plurality of network-accessible pages regarding the individual event includes one or more keywords associated with the individual event within the uniform resource identifier for the page.

6. The system of claim 1, wherein each of the first set of terms and the second set of terms is an n-gram.

7. The system of claim 6, wherein the first set of terms and the second set of terms each includes a plurality of unigrams, a plurality of bigrams and a plurality of trigrams.

8. The system of claim 1, wherein the entire collection of content comprises pages from a reference source, wherein at least a subset of the pages from the reference source comprises pages that are not associated with any event.

9. The system of claim 1, wherein the entire collection of content comprises all pages made available from one or more sources over a defined period of time.

10. The system of claim 1, wherein the plurality of network-accessible pages comprises one or more of news articles, blog posts, microblogs, or social media posts.

11. A computer-implemented method comprising:
as implemented by one or more computing devices configured with specific executable instructions,
retrieving a name of an event;
accessing a reference page associated with the event, wherein the reference page comprises narrative text regarding the event, wherein the reference page further comprises a plurality of references to other pages;
accessing the other pages referenced in the reference page;
generating a first set of terms associated with the event, wherein each of the terms in the first set comprises one or more words, wherein the first set includes (a) one or more terms appearing in text of the reference page and (b) one or terms appearing in text of at least one of the other pages referenced in the reference page;
determining a plurality of network-accessible pages regarding the event based at least in part on determinations that each page of the plurality of network-accessible pages includes a name of the event within a uniform resource identifier for the page;
generating a second set of terms associated with the event, wherein each of the terms of the second set comprises one or more words appearing together in at least one of the plurality of network-accessible pages regarding the event;
for each term in the first set of terms and second set of terms associated with the event, generating a score for the term that represents a strength of association between the term and the event, wherein the score for each term is generated based at least in part on a number of times that the term appears in pages associated with the event relative to at least a frequency with which the term appears in pages associated with other events;
selecting a plurality of top scoring terms associated with the event, wherein the plurality of top scoring terms are selected from among the first set of terms and the second set of terms; and
generating a classification model for determining whether an input page includes text content regarding the event, wherein at least a subset of the top scoring terms associated with the event are used as features in training the classification model.

12. The computer-implemented method of claim 11 further comprising generating a plurality of classification models that are each configured to identify pages that include text regarding a different event.

13. The computer-implemented method of claim 11, wherein the score for each term is generated based at least in further part on a second frequency with which the term is used in an entire collection of content.

14. The computer-implemented method of claim 11, wherein the frequency with which the term appears in pages associated with other events represents an inverted event frequency.

15. The computer-implemented method of claim 14, wherein the inverted event frequency for a given term is determined as a logarithm of a result when dividing (a) a number of total events by (b) a number of the total events that are associated with at least one page in which the given term appears.

16. The computer-implemented method of claim 11, wherein the classification model is generated at least in part by using a random forest classifier.

17. The computer-implemented method of claim 11, further comprising selecting negative examples for training the classification model for the event, wherein the negative examples include pages determined to be associated with at least one other event that is unrelated to the event.

18. The computer-implemented method of claim 17, wherein the at least one other event is determined to be unrelated to the event based at least in part by clustering a plurality of pages to identify pages with similar content.

19. The computer-implemented method of claim 17, wherein the at least one other event is determined to be unrelated to the event based at least in part by applying a distance measure between text of pages associated with the event and text of pages associated with the at least one other event.

20. The computer-implemented method of claim 11 further comprising:
receiving, by a server, a request for an advertisement from a client device, wherein the request is sent as a result of code within a first page being executed by the client device;
determine that text content of the first page relates to the event using the generated classification model;
selecting an advertisement for display in association with the first page based at least in part on an association between the advertisement and the event; and
send the advertisement to the client device for display within the first page.

* * * * *